US010604619B2

(12) United States Patent
Chang et al.

(10) Patent No.: US 10,604,619 B2
(45) Date of Patent: Mar. 31, 2020

(54) ELASTOMER

(71) Applicant: INDUSTRIAL TECHNOLOGY RESEARCH INSTITUTE, Hsinchu (TW)

(72) Inventors: Sheng-Lung Chang, Taoyuan (TW); Jen-Chun Chiu, Pingtung (TW); Yung-Chan Lin, Hsinchu (TW); Chih-Hsiang Lin, Taipei (TW); Chien-Ming Chen, Taoyuan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 116 days.

(21) Appl. No.: 15/856,640

(22) Filed: Dec. 28, 2017

(65) Prior Publication Data

US 2019/0185614 A1 Jun. 20, 2019

(30) Foreign Application Priority Data

Dec. 20, 2017 (TW) .............................. 106144821 A

(51) Int. Cl.
*C08G 63/20* (2006.01)
*C08G 63/16* (2006.01)
*C08G 63/08* (2006.01)
*C08G 63/664* (2006.01)
*C08G 81/02* (2006.01)
*C08G 59/17* (2006.01)
*C08G 63/685* (2006.01)
*C08G 69/44* (2006.01)
*C08G 63/668* (2006.01)
*C08L 67/02* (2006.01)
*C08F 220/06* (2006.01)
*C08F 212/08* (2006.01)

(52) U.S. Cl.
CPC .......... *C08G 63/08* (2013.01); *C08G 59/1466* (2013.01); *C08G 63/664* (2013.01); *C08G 63/668* (2013.01); *C08G 63/6854* (2013.01); *C08G 69/44* (2013.01); *C08G 81/024* (2013.01); *C08F 212/08* (2013.01); *C08F 220/06* (2013.01); *C08F 2500/21* (2013.01)

(58) Field of Classification Search
None
See application file for complete search history.

(56) References Cited

U.S. PATENT DOCUMENTS

| | | | | |
|---|---|---|---|---|
| 3,629,226 A | * | 12/1971 | Lohse et al. | C08G 63/914 525/438 |
| 4,943,623 A | * | 7/1990 | Ebert | C08G 63/60 428/423.7 |
| 6,590,065 B1 | * | 7/2003 | Goldfinger | C08G 69/40 428/221 |
| 7,485,250 B2 | | 2/2009 | Boatman et al. | |
| 7,713,672 B2 | | 5/2010 | Watanabe et al. | |
| 7,718,340 B2 | | 5/2010 | Iwamoto et al. | |
| 7,873,304 B2 | | 1/2011 | Iwamoto et al. | |
| 8,114,560 B2 | | 2/2012 | Nakayama et al. | |
| 8,299,191 B2 | | 10/2012 | Voit et al. | |
| 2004/0030089 A1 | * | 2/2004 | Sunkara | C08G 69/44 528/272 |
| 2015/0025197 A1 | | 1/2015 | Garois et al. | |

FOREIGN PATENT DOCUMENTS

| | | |
|---|---|---|
| CN | 102432869 A | 5/2012 |
| CN | 103265707 B | 10/2015 |
| CN | 106967214 A | 7/2017 |
| EP | 1 783 157 A1 | 5/2007 |
| TW | 200935096 | 8/2009 |
| TW | 200940669 | 10/2009 |
| TW | 201005088 A1 | 2/2010 |
| TW | 201022307 A1 | 6/2010 |
| TW | 201024388 A1 | 7/2010 |
| TW | 201107437 A1 | 3/2011 |
| TW | I596133 B | 8/2017 |

OTHER PUBLICATIONS

Taiwanese Office Action for Appl. No. 106144821 dated Jan. 18, 2019.

* cited by examiner

*Primary Examiner* — Michael J Feely
(74) *Attorney, Agent, or Firm* — Birch, Stewart, Kolasch & Birch, LLP

(57) ABSTRACT

An elastomer is provided, which is a product of reacting $C_{4-12}$ lactam, poly($C_{2-4}$ alkylene glycol), $C_{4-12}$ diacid, and multi-ester aliphatic monomer. The $C_{4-12}$ lactam and the poly($C_{2-4}$ alkylene glycol) have a weight ratio of 20:80 to 80:20. The total weight of the $C_{4-12}$ lactam and the poly($C_{2-4}$ alkylene glycol) and the weight of the $C_{4-12}$ diacid have a ratio of 100:0.5 to 100:10. The total weight of the $C_{4-12}$ lactam and the poly($C_{2-4}$ alkylene glycol) and the weight of the multi-ester aliphatic monomer have a ratio of 100:0.01 to 100:5.

7 Claims, No Drawings

ELASTOMER

CROSS REFERENCE TO RELATED APPLICATIONS

The present application is based on, and claims priority from, Taiwan Application Serial Number 106144821, filed on Dec. 20, 2017, the disclosure of which is hereby incorporated by reference herein in its entirety.

TECHNICAL FIELD

The technical field relates to an elastomer.

BACKGROUND

Thermoplastic elastomers have the following characteristics: high tensile strength, high impact resistance at low temperatures, good softness, impact strength and toughness at low temperature (e.g. −40° C. to −80° C.), flexibility, chemical resistance, climate resistance, and can be shaped and processed with ease. The scraps of thermoplastic elastomers can be recycled and reused, which stretches resources and is beneficial to protect the environment. The thermoplastic elastomers are mainly applied in mechanical and electric precision parts, mobile components, shoes, sports equipment, medical hoses, conveyor belts, and the like. When an elastomer is applied to a shoe component, is may be deformed by an external force. The energy of the force may transfer into molecular chain motions to result in energy loss, thereby reducing the reboundability of the elastomer.

Accordingly, the thermoplastic elastomer should be adjusted to enhance its reboundability.

SUMMARY

One embodiment of the disclosure provides an elastomer, which is formed by reacting $C_{4-12}$ lactam, poly($C_{2-4}$ alkylene glycol), $C_{4-12}$ diacid, and multi-ester aliphatic monomer.

One embodiment of the disclosure provides an elastomer, which is formed by reacting copolymer and multi-epoxy compound, wherein the copolymer is formed by reacting $C_{4-12}$ lactam, poly($C_{2-4}$ alkylene glycol), and $C_{4-12}$ diacid.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides an elastomer, which is formed by reacting $C_{4-12}$ lactam, poly($C_{2-4}$ alkylene glycol), $C_{4-12}$ diacid, and multi-ester aliphatic monomer. In one embodiment, the $C_{4-12}$ lactam can be caprolactam. In one embodiment, the poly($C_{2-4}$ alkylene glycol) may have a chemical structure of

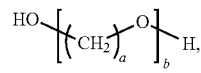

in which a is 2 to 4 and b is 2 to 100. Too much b value results in a soft segment of the alkylene glycol having a poor reactivity due to its molecular weight that is too high. Therefore, the elastomer may have an insufficient mechanical strength since the polymerization degree of the elastomer is too low. For example, the poly($C_{2-4}$ alkylene glycol) can be polytetramethylene ether glycol. In one embodiment, the diacid can be adipic acid. The poly-ester aliphatic monomer can be branched or cyclic, which may have 3 to 8 ester groups to crosslink the functional groups of the other monomers. For example, the multi-ester aliphatic monomer may have a chemical structure of

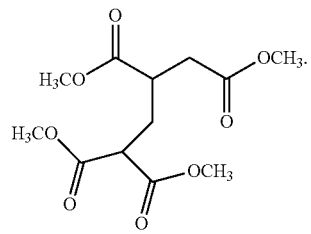

In one embodiment, the $C_{4-12}$ lactam and the poly($C_{2-4}$ alkylene glycol) have a weight ratio of 20:80 to 80:20. The lactam ratio that is too low results in an insufficient mechanical strength of the elastomer due to the soft segment content of the elastomer being too high. The lactam ratio that is too high results in a poor elongation ratio of the elastomer due to the hard segment content of the elastomer being too high. In one embodiment, the total weight of the $C_{4-12}$ lactam and the poly($C_{2-4}$ alkylene glycol) and the weight of the $C_{4-12}$ diacid have a ratio of 100:0.5 to 100:10. The $C_{4-12}$ diacid ratio that is too low cannot efficiently polymerize due to an insufficient acid equivalent. The $C_{4-12}$ diacid ratio that is too high results in a poor polymerization degree and poor elastomer strength due to the acid content that is too high. In one embodiment, the total weight of the $C_{4-12}$ lactam and the poly($C_{2-4}$ alkylene glycol) and the weight of the multi-ester aliphatic monomer have a ratio of 100:0.01 to 100:5. The multi-ester aliphatic monomer ratio that is too low does not have an obvious crosslink effect. The multi-ester aliphatic monomer ratio that is too high easily forms a gel-type product, such that the elastomer has poor properties and cannot be processed.

In one embodiment, the $C_{4-12}$ lactam, poly($C_{2-4}$ alkylene glycol), $C_{4-12}$ diacid, and multi-ester aliphatic monomer are polymerized and crosslinked. Polymerization catalyst such as titanium butoxide, antimony acetate, or another suitable polymerization catalyst can be added into the polymerization. Powder, anti-oxidant, surfactant, defoamer, leveling agent, pigment, or a combination thereof can be added to the elastomer to adjust the properties or appearance of the elastomer. The elastomer has excellent reboundability, and its crosslink structure may further increase the abrasion resistance of the elastomer.

Alternatively, the elastomer is formed by reaction copolymer and multi-epoxy compound. The copolymer is formed by reacting the $C_{4-12}$ lactam, the poly($C_{2-4}$ alkylene glycol), and the $C_{4-12}$ diacid. The types and ratios of the $C_{4-12}$ lactam, the poly($C_{2-4}$ alkylene glycol), and the $C_{4-12}$ diacid are similar to those described above, and the related description is omitted here. In one embodiment, the total weight of the $C_{4-12}$ lactam and the poly($C_{2-4}$ alkylene glycol) and the weight of the multi-epoxy compound have a ratio of 100: 0.01 to 100:5. The multi-epoxy compound ratio that is too low does not have an obvious crosslink effect. The multi-epoxy compound ratio that is too high easily results in a gel-type product, such that the elastomer has poor properties and cannot be processed. The multi-epoxy compound may crosslink the functional groups of the other monomers. For example, the multi-epoxy compound may have a chemical structure of

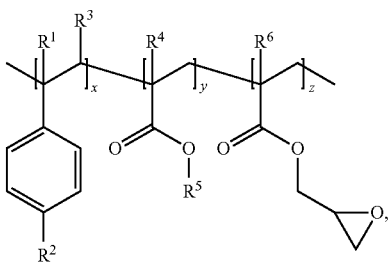

which may have a weight average molecular weight of 3000 to 10000, such as about 6800. In one embodiment, the multi-epoxy compound has a glass transfer temperature of −50° C. to 60° C. (such as about 54° C.), and an epoxy equivalent of about 200 g/mol to 500 g/mol (such as about 285 g/mol). $R^1$ is hydrogen or $C_{1-6}$ alkyl group, $R^2$ is hydrogen or $C_{1-6}$ alkyl group, $R^3$ is hydrogen or $C_{1-6}$ alkyl group, $R^4$ is hydrogen or $C_{1-6}$ alkyl group, $R^5$ is hydrogen or $C_{1-6}$ alkyl group, $R^6$ is hydrogen or $C_{1-6}$ alkyl group, x, y, and z are positive integers, and z>1.

In one embodiment, the $C_{4-12}$ lactam, the poly($C_{2-4}$ alkylene glycol), and the $C_{4-12}$ diacid are firstly polymerized. The polymerization catalyst such as titanium butoxide, antimony acetate, or another suitable polymerization catalyst can be added into the polymerization. The multi-epoxy compound can be then added into the product of the polymerization to crosslink it for obtaining an elastomer. Powder, anti-oxidant, surfactant, defoamer, leveling agent, pigment, or a combination thereof can be added to the elastomer to adjust the properties or appearance of the elastomer. Note that if the multi-epoxy compound is selected to serve as the crosslinker of the elastomer, the other monomers should be polymerized for a period, and the multi-epoxy compound is then added to the polymerized product for crosslinking. If the other monomers and the multi-epoxy compound are mixed to react, the polymerization degree will be poor or the polymerization is not efficiently since the acid-alcohol equivalent ratio of the reactants is not balanced. On the other hand, the multi-ester aliphatic monomer is not limited to the addition sequence, which can be simultaneously reacted with the other monomers to save the step (e.g. one-pot reaction). The elastomer has excellent reboundability, and its crosslink structure may further increase the abrasion resistance of the elastomer.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example (IA-DMM)

70 g of dimethyl malonate (DMM, commercially available from Acros, 0.53 mole) was dissolved in 70 mL of toluene, stirred, and heated to 60° C. 1 mL of 30% KOH solution (dissolved in methanol) was added to the DMM solution. Then, the DMM solution was dropwise added to the mixer of 70 g of dimethyl itaconate (DMIA, commercially available from TCI, 0.443 mole) and 70 mL of toluene. The reaction was continued for a further 2 hours. The reaction result was cooled, and 2 g of active alumina was added to the reaction result and then stirred for 20 minutes. The reaction result was then filtered by an active alumina filtered cake to obtain transparent colorless filtrate. The toluene and methanol in the filtrate were removed by a rotary evaporator, thereby obtaining crude of a multi-ester aliphatic monomer (IA-DMM) and the unreacted DMM, which was a transparent liquid. The transparent liquid was purified by vacuum distillation. The DMM was recycled under a pressure of 15 torr at a temperature of 80° C. Thereafter, 123 g of the product IA-DMM (yield=95.6%, GC purity>99%) was obtained under a pressure of 1.0 torr at 155° C. The spectra of IA-DMM are shown below: $^1$H NMR (400 MHz, ppm, CDCl$_3$): 2.15-2.29 (—CH$_2$, 2H, m), 2.49-2.78 (—CH$_2$, 1H+1H, dd+dd), 2.88 (—CH, 1H, m), 3.53 (—CH, 1H, m), 3.68 (—CH$_3$, 3H, s), 3.71 (—CH$_3$, 3H, s), 3.75 (—CH$_3$, 3H, s), 3.77 (—CH$_3$, 3H, s). $^{13}$C NMR (100 MHz, ppm, CDCl$_3$): 30.4 (—CH$_2$), 36.0 (—CH$_2$), 39.0 (—CH), 49.5 (—CH), 51.8 (—CH$_3$), 52.1 (—CH$_3$), 52.7 (—CH$_3$), 169.1 (C=O), 171.6 (C=O), 174.0 (C=O).

Example 1

0.5 parts by weight of caprolactam (CPL), 0.5 parts by weight of polytetramethylene ether glycol (PTMEG, commercially available from Aldrich, Mn is about 1000), 0.07 parts by weight of adipic acid (AA), and 0.003 parts by weight of the poly-ester aliphatic monomer IA-DMM were reacted under nitrogen at 230° C. for 3 hours. The mixture was then heated to 240° C. 0.002 parts by weight of polymerization catalyst titanium butoxide (TBT), 0.001 parts by weight of anti-oxidant CHEMNOX-1010 (commercially available from Chembridge), and 0.001 parts by weight of anti-oxidant CHEMNOX-1098 (commercially available from Chembridge) were then added to the mixture. The mixture was then vacuumed to be polymerized until the stirring torque of the reaction achieving 180. The vacuum of the reaction result was broken by nitrogen, and the reaction result was then poured into water to be cooled and pelletized. An elastomer was obtained, dried, and then stored. The reaction is shown as below:

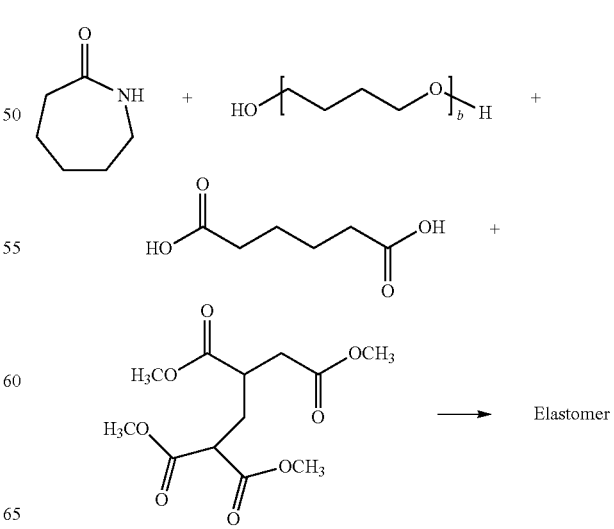

The elastomer had a Tm of 189° C. and a Tcc of 129° C., which were measured by differential scanning calorimetry (DSC). The elastomer had an intrinsic viscosity (IV) of 1.34 at 25° C., which was measured by an Oswalt viscometer. The elastomer had a tensile strength of 337 kgf/cm$^2$ (measured by the standard ASTM D638), elongation ratio of 806% (measured by the standard ASTM D638), a Shore-D hardness of 38D (measured by the standard ASTM D2204), and an rebound rate of 58% (measured by the standard ASTM D2632).

Example 2

0.5 parts by weight of CPL, 0.5 parts by weight of PTMEG, 0.068 parts by weight of AA, and 0.005 parts by weight of IA-DMM were reacted under nitrogen at 230° C. for 3 hours. The mixture was then heated to 240° C. 0.002 parts by weight of TBT, 0.001 parts by weight of CHEMNOX-1010, and 0.001 parts by weight of CHEMNOX-1098 were then added to the mixture. The mixture was then vacuumed to be polymerized until the stirring torque of the reaction achieving 180. The vacuum of the reaction result was broken by nitrogen, and the reaction result was then poured into water to be cooled and pelletized. An elastomer was obtained, dried, and then stored.

The elastomer had a Tm of 192° C. and a Tcc of 135° C., which were measured by DSC. The elastomer had an intrinsic viscosity (IV) of 1.43 at 25° C., which was measured by an Oswalt viscometer. The elastomer had a tensile strength of 292 kgf/cm$^2$ (measured by the standard ASTM D638), elongation ratio of 766% (measured by the standard ASTM D638), a Shore-D hardness of 41D (measured by the standard ASTM D2204), and an rebound rate of 57% (measured by the standard ASTM D2632).

Example 3

0.5 parts by weight of CPL, 0.5 parts by weight of PTMEG, 0.063 parts by weight of AA, and 0.007 parts by weight of IA-DMM were reacted under nitrogen at 230° C. for 3 hours. The mixture was then heated to 240° C. 0.002 parts by weight of TBT, 0.001 parts by weight of CHEMNOX-1010, and 0.001 parts by weight of CHEMNOX-1098 were then added to the mixture. The mixture was then vacuumed to be polymerized until the stirring torque of the reaction achieving 180. The vacuum of the reaction result was broken by nitrogen, and the reaction result was then poured into water to be cooled and pelletized. An elastomer was obtained, dried, and then stored.

The elastomer had a Tm of 192° C. and a Tcc of 137° C., which were measured by DSC. The elastomer had an intrinsic viscosity (IV) of 1.51 at 25° C., which was measured by an Oswalt viscometer. The elastomer had a tensile strength of 336 kgf/cm$^2$ (measured by the standard ASTM D638), elongation ratio of 805% (measured by the standard ASTM D638), a Shore-D hardness of 39D (measured by the standard ASTM D2204), and an rebound rate of 59% (measured by the standard ASTM D2632).

Example 4

0.5 parts by weight of CPL, 0.5 parts by weight of PTMEG, 0.063 parts by weight of AA, and 0.01 parts by weight of IA-DMM were reacted under nitrogen at 230° C. for 3 hours. The mixture was then heated to 240° C. 0.002 parts by weight of TBT, 0.001 parts by weight of CHEMNOX-1010, and 0.001 parts by weight of CHEMNOX-1098 were then added to the mixture. The mixture was then vacuumed to be polymerized until the stirring torque of the reaction achieving 180. The vacuum of the reaction result was broken by nitrogen, and the reaction result was then poured into water to be cooled and pelletized. An elastomer was obtained, dried, and then stored.

The elastomer had a Tm of 192° C. and a Tcc of 137° C., which were measured by DSC. The elastomer had an intrinsic viscosity (IV) of 1.21 at 25° C., which was measured by an Oswalt viscometer. The elastomer had a tensile strength of 380 kgf/cm$^2$ (measured by the standard ASTM D638), elongation ratio of 806% (measured by the standard ASTM D638), a Shore-D hardness of 40D (measured by the standard ASTM D2204), and an rebound rate of 63% (measured by the standard ASTM D2632).

Example 5

0.5 parts by weight of CPL, 0.5 parts by weight of PTMEG, 0.058 parts by weight of AA, and 0.015 parts by weight of IA-DMM were reacted under nitrogen at 230° C. for 3 hours. The mixture was then heated to 240° C. 0.002 parts by weight of TBT, 0.001 parts by weight of CHEMNOX-1010, and 0.001 parts by weight of CHEMNOX-1098 were then added to the mixture. The mixture was then vacuumed to be polymerized until the stirring torque of the reaction achieving 180. The vacuum of the reaction result was broken by nitrogen, and the reaction result was then poured into water to be cooled and pelletized. An elastomer was obtained, dried, and then stored.

The elastomer had a Tm of 193° C. and a Tcc of 145° C., which were measured by DSC. The elastomer had an intrinsic viscosity (IV) of 1.23 at 25° C., which was measured by an Oswalt viscometer. The elastomer had a tensile strength of 278 kgf/cm$^2$ (measured by the standard ASTM D638), elongation ratio of 766% (measured by the standard ASTM D638), a Shore-D hardness of 37D (measured by the standard ASTM D2204), and an rebound rate of 61% (measured by the standard ASTM D2632).

Example 6

0.5 parts by weight of CPL, 0.5 parts by weight of PTMEG, and 0.073 parts by weight of AA were reacted under nitrogen at 230° C. for 3 hours. The mixture was then heated to 240° C. 0.002 parts by weight of TBT, 0.001 parts by weight of CHEMNOX-1010, and 0.001 parts by weight of CHEMNOX-1098 were then added to the mixture. The mixture was then vacuumed to be polymerized until the stirring torque of the reaction achieving 180. The vacuum of the reaction was broken by nitrogen, and 0.003 parts by weight of multi-epoxy compound ADR-4370S (commercially available from BASF) was then added into the reaction to be stirred for a further 10 minutes. The reaction result was then poured into water to be cooled and pelletized. An elastomer was obtained, dried, and then stored. The elastomer had a Tm of 190° C. and a Tcc of 128° C., which were measured by DSC. The elastomer had an intrinsic viscosity (IV) of 1.40 at 25° C., which was measured by an Oswalt viscometer. The elastomer had a tensile strength of 297 kgf/cm$^2$ (measured by the standard ASTM D638), elongation ratio of 68'7% (measured by the standard ASTM D638), a Shore-D hardness of 38D (measured by the standard ASTM D2204), and an rebound rate of 53% (measured by the standard ASTM D2632).

Example 7

0.6 parts by weight of CPL, 0.4 parts by weight of PTMEG, 0.05 parts by weight of AA, and 0.01 parts by weight of IA-DMM were reacted under nitrogen at 230° C. for 3 hours. The mixture was then heated to 240° C. 0.002 parts by weight of TBT, 0.001 parts by weight of CHEMNOX-1010, and 0.001 parts by weight of CHEMNOX-1098 were then added to the mixture. The mixture was then vacuumed to be polymerized until the stirring torque of the reaction achieving 180. The vacuum of the reaction result was broken by nitrogen, and the reaction result was then poured into water to be cooled and pelletized. An elastomer was obtained, dried, and then stored.

The elastomer had a Tm of 201° C. and a Tcc of 151° C., which were measured by DSC. The elastomer had an intrinsic viscosity (IV) of 1.31 at 25° C., which was measured by an Oswalt viscometer. The elastomer had a tensile strength of 297 kgf/cm$^2$ (measured by the standard ASTM D638), elongation ratio of 543% (measured by the standard ASTM D638), a Shore-D hardness of 44D (measured by the standard ASTM D2204), and an rebound rate of 48% (measured by the standard ASTM D2632).

Example 8

0.7 parts by weight of CPL, 0.3 parts by weight of PTMEG, 0.036 parts by weight of AA, and 0.01 parts by weight of IA-DMM were reacted under nitrogen at 230° C. for 3 hours. The mixture was then heated to 240° C. 0.002 parts by weight of TBT, 0.001 parts by weight of CHEMNOX-1010, and 0.001 parts by weight of CHEMNOX-1098 were then added to the mixture. The mixture was then vacuumed to be polymerized until the stirring torque of the reaction achieving 180. The vacuum of the reaction result was broken by nitrogen, and the reaction result was then poured into water to be cooled and pelletized. An elastomer was obtained, dried, and then stored.

The elastomer had a Tm of 207° C. and a Tcc of 161° C., which were measured by DSC. The elastomer had an intrinsic viscosity (IV) of 1.27 at 25° C., which was measured by an Oswalt viscometer. The elastomer had a tensile strength of 327 kgf/cm$^2$ (measured by the standard ASTM D638), elongation ratio of 543% (measured by the standard ASTM D638), a Shore-D hardness of 47D (measured by the standard ASTM D2204), and an rebound rate of 46% (measured by the standard ASTM D2632).

Comparative Example 1

0.5 parts by weight of CPL, 0.5 parts by weight of PTMEG, and 0.05 parts by weight of AA were reacted under nitrogen at 230° C. for 3 hours. The mixture was then heated to 240° C. 0.002 parts by weight of TBT, 0.001 parts by weight of CHEMNOX-1010, and 0.001 parts by weight of CHEMNOX-1098 were then added to the mixture. The mixture was then vacuumed to be polymerized until the stirring torque of the reaction achieving 180. The vacuum of the reaction result was broken by nitrogen, and the reaction result was then poured into water to be cooled and pelletized. An elastomer was obtained, dried, and then stored.

The elastomer had a Tm of 189° C. and a Tcc of 125° C., which were measured by DSC. The elastomer had an intrinsic viscosity (IV) of 1.20 at 25° C., which was measured by an Oswalt viscometer. The elastomer had a tensile strength of 388 kgf/cm$^2$ (measured by the standard ASTM D638), elongation ratio of 840% (measured by the standard ASTM D638), a Shore-D hardness of 38D (measured by the standard ASTM D2204), and an rebound rate of 55% (measured by the standard ASTM D2632).

Comparative Example 2

0.6 parts by weight of CPL, 0.4 parts by weight of PTMEG, and 0.08 parts by weight of AA were reacted under nitrogen at 230° C. for 3 hours. The mixture was then heated to 240° C. 0.002 parts by weight of TBT, 0.001 parts by weight of CHEMNOX-1010, and 0.001 parts by weight of CHEMNOX-1098 were then added to the mixture. The mixture was then vacuumed to be polymerized until the stirring torque of the reaction achieving 180. The vacuum of the reaction result was broken by nitrogen, and the reaction result was then poured into water to be cooled and pelletized. An elastomer was obtained, dried, and then stored.

The elastomer had a Tm of 199° C. and a Tcc of 146° C., which were measured by DSC. The elastomer had an intrinsic viscosity (IV) of 1.25 at 25° C., which was measured by an Oswalt viscometer. The elastomer had a tensile strength of 360 kgf/cm$^2$ (measured by the standard ASTM D638), elongation ratio of 707% (measured by the standard ASTM D638), a Shore-D hardness of 44D (measured by the standard ASTM D2204), and an rebound rate of 46% (measured by the standard ASTM D2632).

Comparative Example 3

0.7 parts by weight of CPL, 0.3 parts by weight of PTMEG, and 0.05 parts by weight of AA were reacted under nitrogen at 230° C. for 3 hours. The mixture was then heated to 240° C. 0.002 parts by weight of TBT, 0.001 parts by weight of CHEMNOX-1010, and 0.001 parts by weight of CHEMNOX-1098 were then added to the mixture. The mixture was then vacuumed to be polymerized until the stirring torque of the reaction achieving 180. The vacuum of the reaction result was broken by nitrogen, and the reaction result was then poured into water to be cooled and pelletized. An elastomer was obtained, dried, and then stored.

The elastomer had a Tm of 207° C. and a Tcc of 157° C., which were measured by DSC. The elastomer had an intrinsic viscosity (IV) of 1.15 at 25° C., which was measured by an Oswalt viscometer. The elastomer had a tensile strength of 373 kgf/cm$^2$ (measured by the standard ASTM D638), elongation ratio of 464% (measured by the standard ASTM D638), a Shore-D hardness of 50D (measured by the standard ASTM D2204), and an rebound rate of 45% (measured by the standard ASTM D2632).

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. An elastomer, being formed by reacting $C_{4-12}$ lactam, poly($C_{2-4}$ alkylene glycol), $C_{4-12}$ diacid, and multi-ester aliphatic monomer.

2. The elastomer as claimed in claim 1, wherein the $C_{4-12}$ lactam and the poly($C_{2-4}$ alkylene glycol) have a weight ratio of 20:80 to 80:20.

3. The elastomer as claimed in claim 1, wherein a total weight of the $C_{4-12}$ lactam and the poly($C_{2-4}$ alkylene glycol) and a weight of the $C_{4-12}$ diacid have a ratio of 100:0.5 to 100:10.

4. The elastomer as claimed in claim 1, wherein a total weight of the $C_{4-12}$ lactam and the poly($C_{2-4}$ alkylene glycol) and a weight of the multi-ester aliphatic monomer have a ratio of 100:0.01 to 100:5.

5. The elastomer as claimed in claim 1, wherein the multi-ester aliphatic monomer is branched or cyclic, and has 3 to 8 ester groups.
6. The elastomer as claimed in claim 1, wherein the multi-ester aliphatic monomer has a chemical structure of
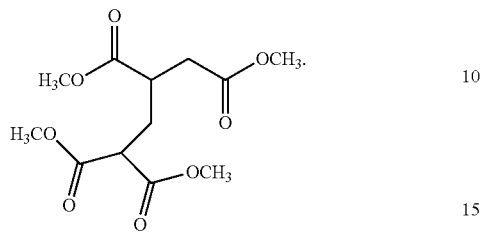
7. The elastomer as claimed in claim 1, wherein the poly($C_{2-4}$ alkylene glycol) has a chemical structure of
wherein a is 2 to 4, and b is 2 to 100.
* * * * *